(12) United States Patent
Stojanovski

(10) Patent No.: US 6,964,547 B2
(45) Date of Patent: Nov. 15, 2005

(54) MILLING TOOL HOLDER WITH THREADED PLUG

(76) Inventor: Stojan Stojanovski, 13300 W. Star Dr., Shelby Township, MI (US) 48315

( * ) Notice: Subject to any disclaimer, the term of this patent is extended or adjusted under 35 U.S.C. 154(b) by 48 days.

(21) Appl. No.: 10/812,784

(22) Filed: Mar. 31, 2004

(65) Prior Publication Data

US 2005/0089382 A1    Apr. 28, 2005

Related U.S. Application Data

(63) Continuation-in-part of application No. 10/693,418, filed on Oct. 27, 2003.

(51) Int. Cl.$^7$ ................................................ B23C 1/00
(52) U.S. Cl. ..................... 409/233; 409/232; 279/8; 408/239 A
(58) Field of Search ................. 409/233, 232, 409/231, 234; 408/239 R, 238, 239 A; 279/8, 279/143, 145; 82/158, 159, 160; 403/373, 403/374.1, 374.2, 374.3, 374.4; 411/60.2, 411/55, 57.1, 271, 325

(56) References Cited

U.S. PATENT DOCUMENTS

| | | | | |
|---|---|---|---|---|
| 4,557,642 A | * | 12/1985 | Dudas et al. | ............ 408/239 R |
| 4,777,715 A | * | 10/1988 | Roberts | ....................... 409/233 |
| 4,856,944 A | * | 8/1989 | Reinauer | ......................... 279/8 |
| 5,193,954 A | * | 3/1993 | Hunt | ............................ 409/233 |
| 5,354,076 A | * | 10/1994 | Yeo et al. | .................... 409/233 |
| 5,447,485 A | * | 9/1995 | Bory et al. | .................. 409/233 |
| 5,795,114 A | * | 8/1998 | Schweizer et al. | ........... 409/233 |
| 5,971,681 A | * | 10/1999 | Wolfe et al. | ................. 409/233 |
| 6,264,409 B1 | * | 7/2001 | Date et al. | ................... 409/233 |
| 6,287,059 B1 | * | 9/2001 | Hashidate et al. | ........... 409/233 |
| 6,533,507 B2 | * | 3/2003 | Sailing | ........................ 409/233 |

* cited by examiner

*Primary Examiner*—Boyer D. Ashley
*Assistant Examiner*—Dana Ross
(74) *Attorney, Agent, or Firm*—Charles W. Chandler

(57) ABSTRACT

A milling tool holder axially having a shank with a tapered female opening, and a tool holder having a tapered male end that fits into the female opening. The narrow end of the male end has a bore. A plug having a threaded opening is inserted in the bore in the tool holder to align the threaded opening to receive the threaded end of a draw screw. The draw screw is turned to draw the tool holder and the shank together. When the draw screw is turned in one direction, the two components are drawn together, and when turned in the opposite direction the two components may be separated. A camming plug in the narrow end of the tool holder expands the outer surface of the tool holder to wedge the male end in the female opening.

17 Claims, 4 Drawing Sheets

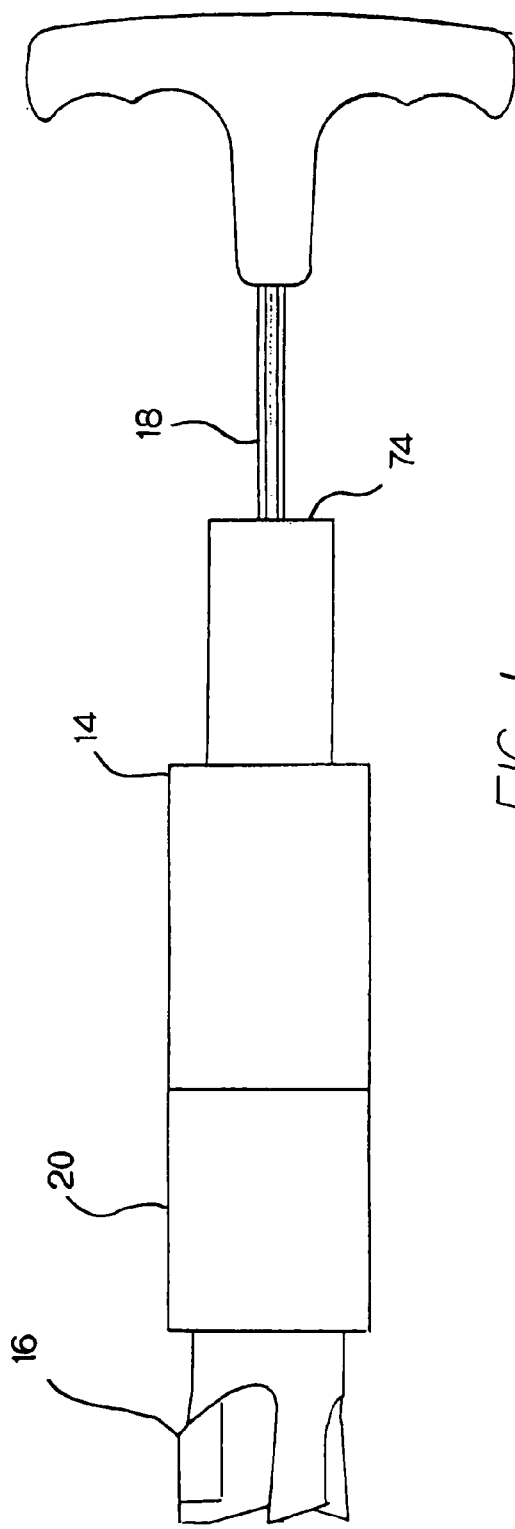
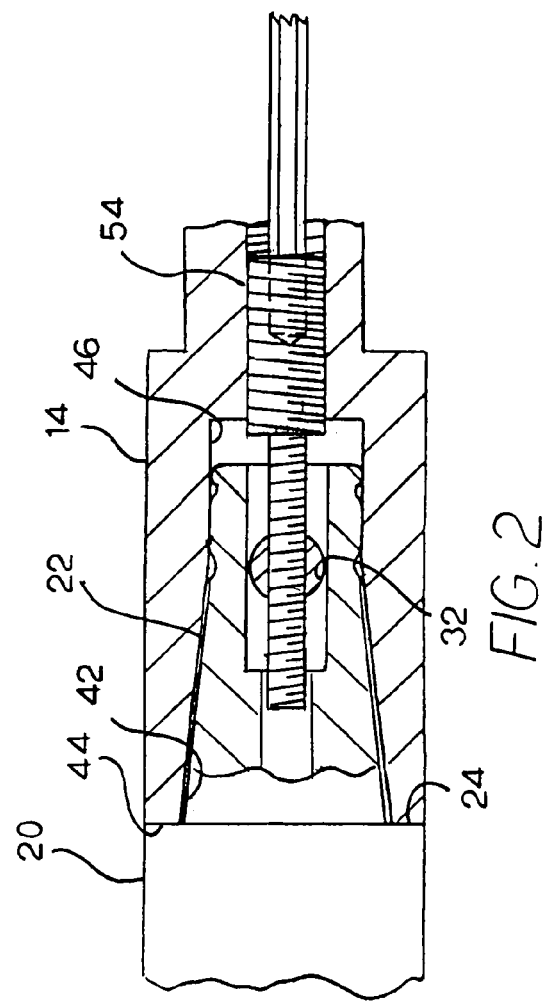

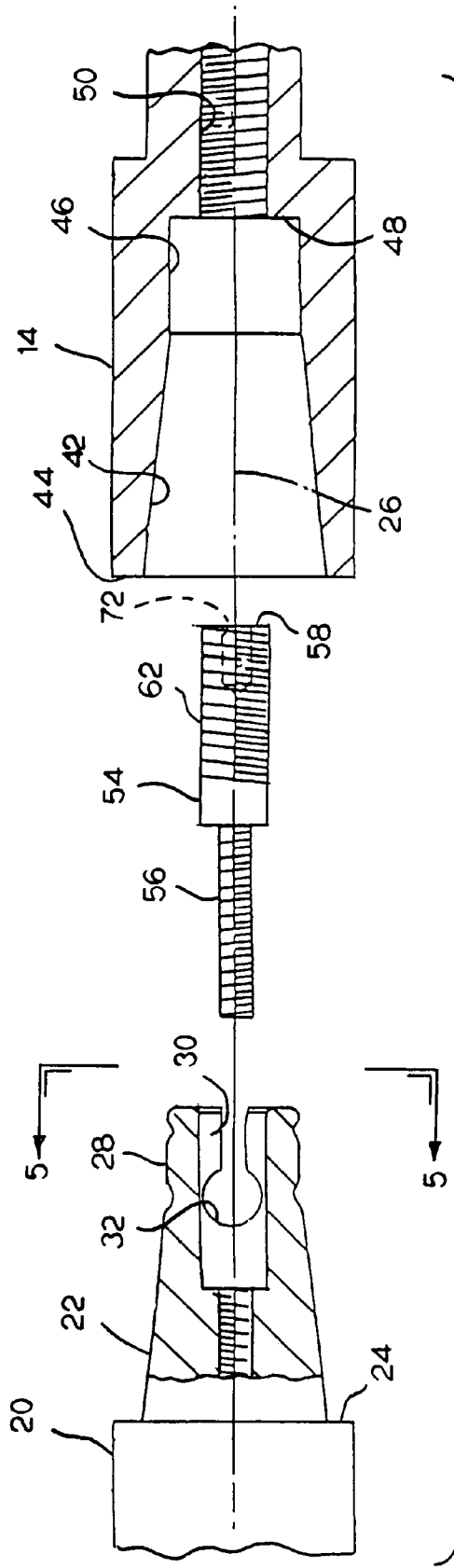
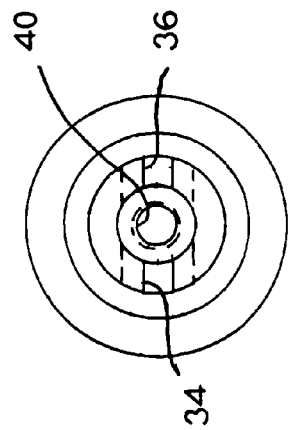
FIG. 3
FIG. 4
FIG. 5
FIG. 6

MILLING TOOL HOLDER WITH THREADED PLUG

CROSS-REFERENCE TO RELATED APPLICATION

This application is a continuation-in-part of U.S. patent application Ser. No. 10/693,418, filed Oct. 27, 2003 for A MILLING TOOL HOLDER WITH DIFFERENTIAL SCREW.

BACKGROUND AND SUMMARY OF THE INVENTION

Tool holders for milling tools commonly employ a male tool-holding component having a frustoconical end, and a female driven shank having an opening for receiving the frustoconical end. Various ways are known in the art for tightly joining the shank to the tool holder.

My prior pending application disclosed a novel way for joining the tool holder and the shank together to prevent the tool from chattering from tool movement such as when used in a hydraulic tool system. My earlier invention prevents tool deflection, and avoids a poorly finished workpiece.

The broad purpose of the present invention is to provide an improved tool holder combination comprising an elongated tool holder having means at one end for supporting a milling tool, a frustoconical or tapered midsection and a slotted cylindrical end.

The shank has a frustoconical opening for receiving the tapered section of the tool holder, and an inner cylindrical cavity for receiving the cylindrical end of the tool holder.

A camming plug is inserted into the smooth cylindrical bore of the tool holder transverse to the turning axis of the tool holder. Both the tool holder and the shank have aligned bores along the turning axis for receiving a draw screw. The plug has threads aligned with the turning axis of the tool holder. A draw screw is inserted in the bore of the shank and engages the plug threads in the tool holder. Turning the screw draws the tapered end of the tool holder into the frustoconical opening in the shank. The camming plug cams the tool to slightly enlarge the diameter of the tool holder in the shank opening to form a tight fitting connection between the tool holder and the shank.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 illustrates a rotatable shank coupled to a tool holder and showing a tool for turning an internal draw screw for drawing the two components together;

FIG. 2 is a longitudinal sectional view showing the tapered portion of the tool holder engaging the opening in the shank;

FIG. 3 is an exploded view showing the tool holder, the draw screw, and the shank;

FIG. 4 is a perspective view of the camming plug;

FIG. 5 is a view showing the location of the camming plug in the tool holder opening;

FIG. 6 is a view of a pin that prevents rotation of the tool holder;

DESCRIPTION OF THE PREFERRED EMBODIMENT

Figure 7:
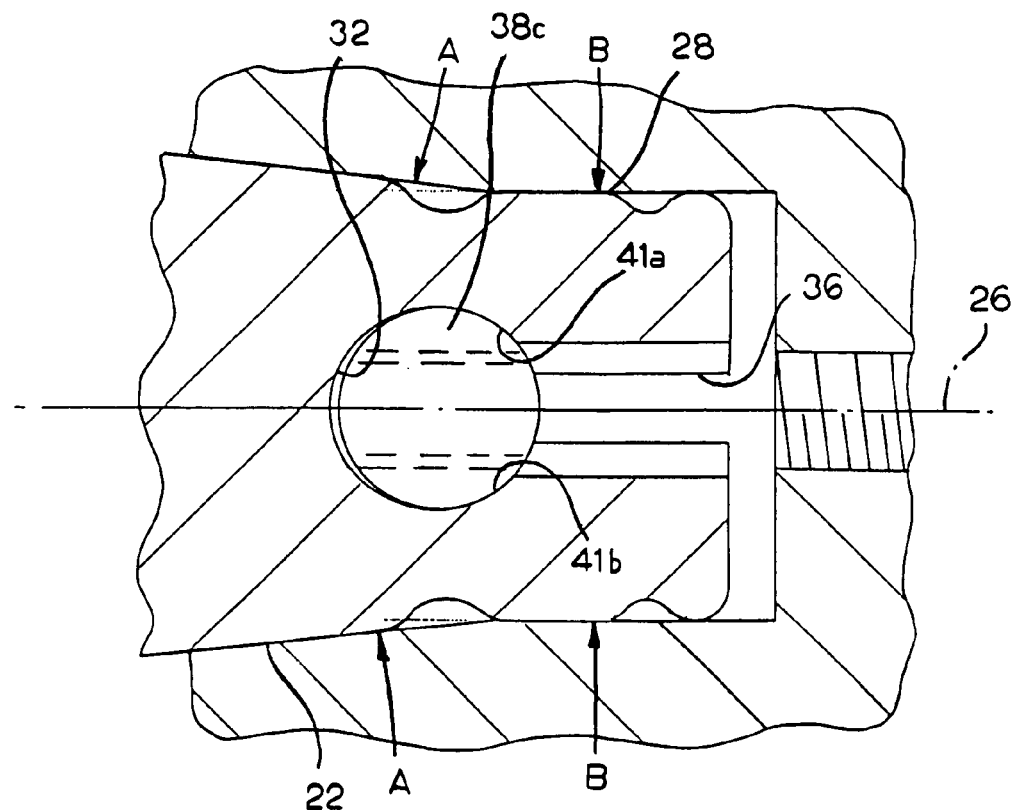
FIG. 7 is an enlarged section view of the camming plug enlarging the outside surface of the tool holder.

Referring to the drawings, FIG. 1 illustrates a preferred tool holder combination 10 comprising a tool holder 12 joined to a shank 14. A milling tool 16 is carried, either integrally or by a suitable mounting on the outer end of the tool holder. An elongated hexagonal tool 18 is inserted inside the shank for purposes which will be described. The shank is driven by a rotating drive means, not shown.

Referring to FIGS. 2 and 3, tool holder 12 includes a body 20. The body has an integral frustoconical (tapered) midsection 22 with a large end terminating in an annular seat 24. The narrow end of midsection 22 has an integral cylindrical neck 28. Neck 28 also has a pair of aligned axial slots 34 and 36, as best shown in FIG. 5, and an internal smooth bore 30. In use the shank and the tool holder body are rotated about a turning axis 26.

The tool holder has a cylindrical plug-receiving opening 32 formed along an axis that is transverse to turning axis 26.

Referring to FIG. 4, a cylindrical camming plug 38 is slidably receivable in plug-receiving opening 32. Plug 38 has an internal right-handed threaded opening 40 formed in such a manner that when the plug is inserted in plug-receiving opening 32, threaded opening 40 is aligned with turning axis 26 of the tool holder. Plug 38 has a length that is slightly less than the diameter of neck 28 so that neither end of the plug extends beyond the profile of the neck.

Referring to FIG. 7, plug 38 has a diameter larger than the width of slots 34 and 36, and slightly less than the diameter of plug-receiving opening 32.

Plug-receiving opening 32 borders the inner ends of slots 34 and 36, forming a pair of concave camming surfaces 41a and 41b, which with slots 34 and 36 can slightly expand the diameter of both the neck and the narrow end of the tapered midsection. When plug 38 is axially moved toward the slots, the neck and the narrow end of midsection expand in the areas A and B, and the distance between opposite sides of the slots can be increased.

Referring to FIG. 2, shank 14 has an outer diameter identical to that of body 20 of tool holder. One end of the shank has a female frustoconical opening 42 which terminates at its outer end with an annular seat 44 that mates in face-to-face contact with seat 24.

The narrow end of opening 42 terminates with a short cylindrical bore 36 which receives neck 28. The inner end of bore 46 terminates with end face 48. Opening 42 is adapted to receive the frustoconical midsection of the tool holder in a position in which neck 28 enters bore 46 and seat 44 is in face-to-face contact with seat 24 of the tool holder.

The shank has a left-handed threaded bore 50 which extends along turning axis 26 and has an inner end opening into bore 46 and an outer end 52 for receiving elongated hexagonal wrench 18.

An elongated draw screw 54 (differential screw) has a threaded end 56 threadably receivable in threaded opening 40 in camming plug 38. The opposite end 58 of the draw screw has an internal hexagonal opening 60 for mating with the inner end of tool 18 such that tool 18 can be used to turn the draw screw to urge the tool holder either toward or away from the shank. The draw screw also has a threaded section 62, receivable in threaded opening 50. Threaded end 56 and threaded section 62 have right and left hand threads, respectively.

Referring to FIG. 6, tool holder 12 has a semi-cylindrical radial groove 64 in seat 24. The shank has a semi-cylindrical radial groove 66 in end face 44. A pin 68 is press fitted in a pin-receiving opening 70 formed when the two radial grooves are rotated to a face-to-face position, and drawn together. Pin 68 prevents any rotation of the shank with respect to the tool holder for work requiring a heavy cut. A lighter cut does not require pin 66.

In use, the user aligns the tool holder and the shank in the position illustrated in FIG. 3. He inserts the draw screw through bore 46 until threaded end 56 engages threaded opening 40 of camming plug 38. He threadably engages the outer end of the draw screw with threaded bore 50. He then inserts tool 18 into the hexagonal bore 72 of the draw screw and turns the draw screw to pull the tool holder body into shank opening. He continues this motion until seat 24 of the tool holder and seat 44 of the shank are in face-to-face contact, and the plug expands neck 28 to tightly engage the cylindrical wall of bore 46 at B—B. The plug also expands the narrow end of the tapered midsection of the tool holder to tightly engage the tapered wall of the shank at A—A, adjacent slots 34 and 36.

Figure 8:
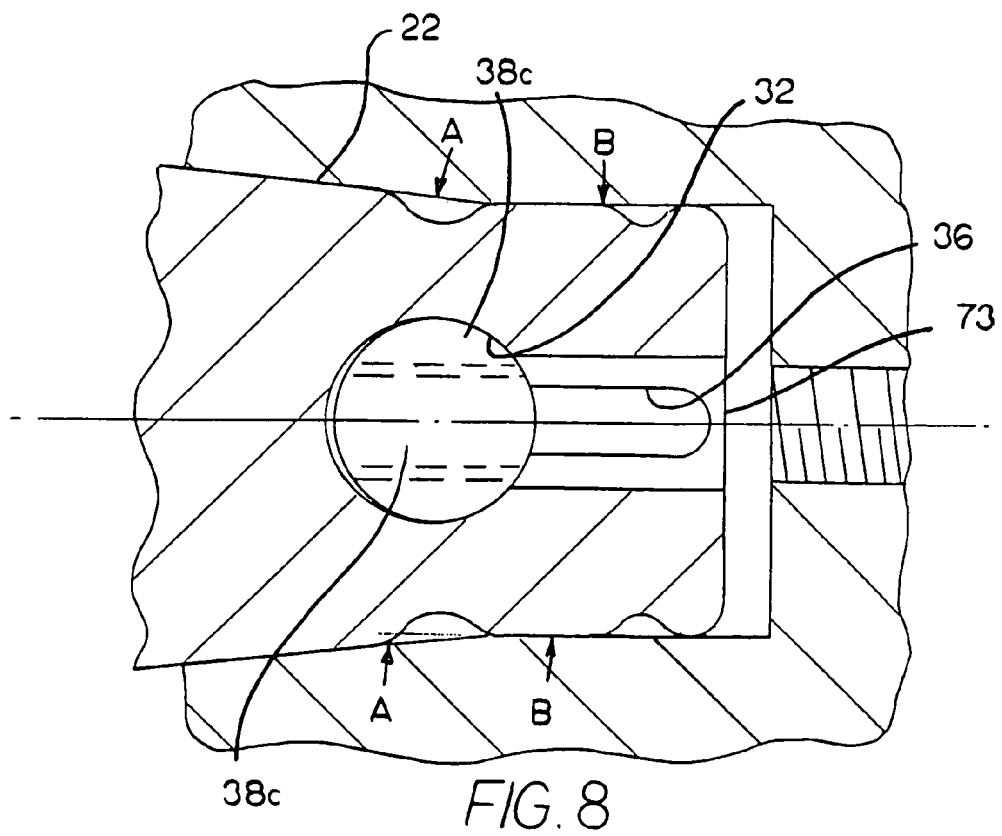
FIG. 8 is an enlarged sectional view of another embodiment of the tool holder.
Figure 9:
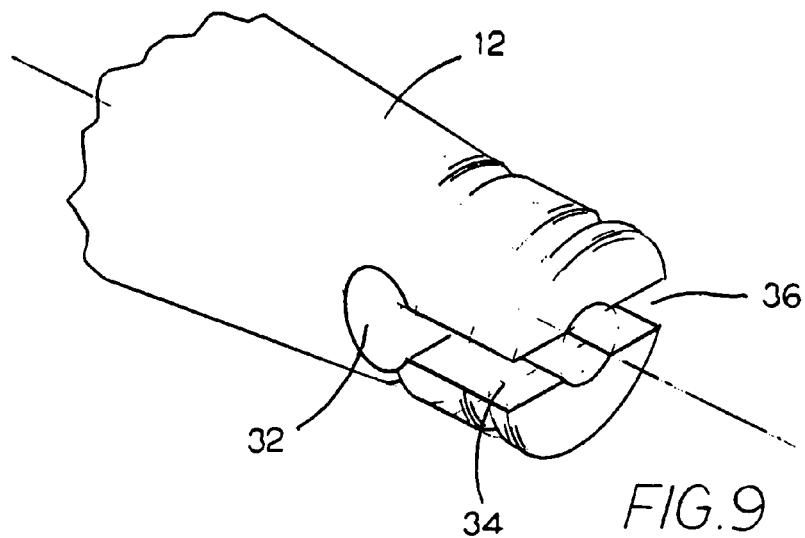
FIG. 9 is a fragmentary perspective view of the camming plug and the tool holder.
Figure 10:
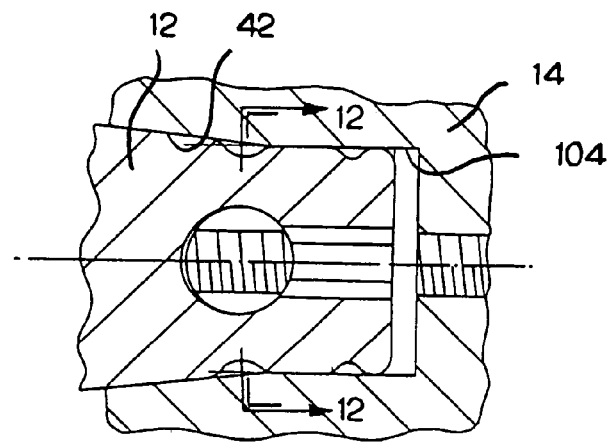
FIG. 10 is a fragmentary view of another embodiment of the invention.
Figure 11:
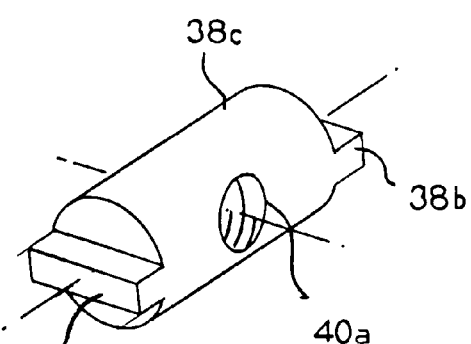
FIG. 11 illustrates a camming plug for the embodiment of FIG. 10.
Figure 12:
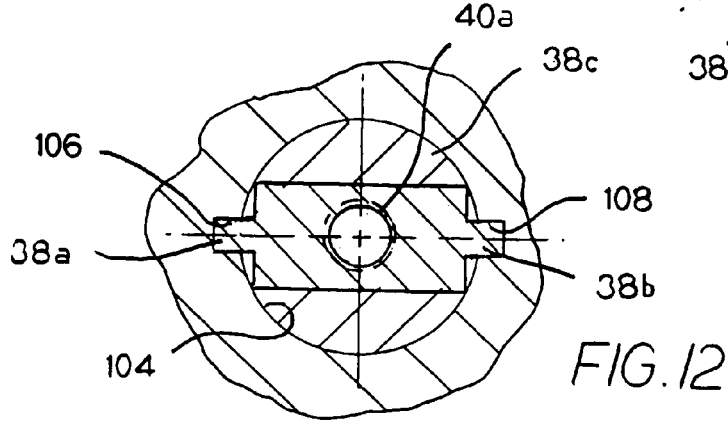
FIG. 12 is an enlarged sectional view as seen along lines 12—12 of FIG. 10.

FIG. 8 illustrates another embodiment of the invention in which slots 34 and 36 are closed at lip 73. Neck 28 is still expanded by the camming plug in the shank opening as in the embodiment of FIG. 7.

FIGS. 9–12 illustrate a modified embodiment 100 of the invention. In this case, shank 14 has a female frustoconical opening 42 for receiving the tapered midsection of body 12.

A smooth inner bore 104 in the shank has a pair of longitudinal grooves 106 and 108 on opposite sides of the base.

Camming plug 38c is slidably receivable in plug-receiving opening 32 and has a pair of integral keys 38a and 38b receivable, respectively, in grooves 106 and 108. This arrangement prevents the tool holder from being turned with respect to the shank. The plug has a threaded bore 40a adapted to receive the threaded end 56 of the draw screw. The manner in which the tool holder is joined to the shank is the same as in the embodiment of FIG. 3.

A cap screw (not shown) can be used in place of the differential screw by making bore 50 smooth with a larger diameter than that of the cap screw body. The cap of the screw would have a larger diameter than bore 50, and bear against outer end 74 of the shank (see FIG. 1).

Having described my invention, I claim:

1. A tool holder apparatus, comprising:
   an elongated shank intended to be supported for rotation about a turning axis, said shank having an internal female frustoconical opening at a first end thereof, and an axial first bore having an inner end opening to said frustoconical opening;
   an elongated tool holder having a first end for supporting a cutting tool in a cutting position, an external male frustoconical structure receivable in the frustoconical opening of the shank, and a narrow second end having an expandable outer surface and axial slots;
   the narrow end of the tool holder has an axial bore therein;
   threaded camming structure movably mounted in the tool holder second bore;
   an elongated drawing member received in said first bore of the shank, the drawing member having an inner threaded end disposed in said frustoconical opening engageable with the threaded structure in the tool holder such that as the drawing member is turned about said turning axis in a first direction, the male end of the tool holder is moved toward a locked position in the female end of the shank, and as the drawing member is turned in the opposite direction, the tool holder is axially movable away from the shank;
   the tool holder having a second bore intersecting said first bore;
   the threaded structure in said second bore comprising;
   camming structure disposed in the second bore of the tool holder, the camming structure having a threaded bore for receiving the inner threaded end of the drawing member; and
   the camming structure being axially movable to a camming position in the second bore to expand the slotted narrow second end of the tool holder into engagement with the female opening of the shank; the drawing member being operative to move the camming structure to expand the male frustoconical structure in the female opening to a locked position.

2. A tool holder apparatus as defined in claim 1, in which the male second end of the tool holder has a cylindrical expandable outer surface, and the camming structure is engageable with said second end to expand the second end in a female cylindrical cavity of the shank to prevent rotational motion of the tool holder and said shank.

3. A tool holder apparatus as defined in claim 2, in which the second end of the tool holder has a pair of axial slots permitting expansion of said second end.

4. A tool holder apparatus as defined in claim 3, in which the slots extend to the extreme end of the tool holder second end.

5. A tool holder apparatus as defined in claim 3, in which said axial slots have ends spaced from the extreme end of the tool holder second end.

6. A tool holder apparatus as defined in claim 3, in which the plug is disposed in the narrow end of the tool holder adjacent said slots to expand the expandable outer surface of the tool holder by increasing the distance between opposite sides of the slots.

7. A tool holder apparatus as defined in claim 2, in which the tool holder has a plug-receiving opening between a narrow end of the frustoconical structure, and a cylindrical end, and the camming structure includes a plug-receivable in the plug-receiving opening in which a threaded opening in the plug is aligned in the tool holder's first bore to threadably engage the drawing member.

8. A tool holder apparatus as defined in claim 1, in which the drawing member is a draw screw.

9. A tool holder apparatus as defined in claim 1, in which the drawing member is a cap screw.

10. A tool holder apparatus as defined in claim 1, in which the camming structure comprises the plug having a pair of keys that extend beyond the outer surface of the expandable outer surface of the tool holder, and the female end has a pair of slots for receiving the keys to prevent rotation of the tool holder with respect to the shank.

11. A tool holder apparatus as defined in claim 1, in which the tool holder carries an integrally mounted tool for a cutting motion.

12. A tool holder apparatus as defined in claim 1, in which the drawing member has an end with a wrench-receiving opening, and the shank provides access through the shank for a wrench to engage and turn the drawing screw along said turning axis.

13. A tool holder apparatus, comprising:
an elongated shank intended to be supported for rotation about an axial turning axis, said shank having an internal female frustoconical opening at a first end thereof, and an axial first bore having an inner end opening to said frustoconical opening first end;
an elongated tool holder having a first end for supporting a cutting tool in a cutting position, an external male frustoconical structure receivable in the frustoconical opening of the shank the tool holder having a second end having an expandable outer surface, the tool holder's second end having an axial second bore therein;
threaded camming structure mounted in the tool holder second bore;
a differential draw screw received in said shank's first bore, the differential draw screw having an inner end disposed in the shank opening and an opposite end engaged with the camming structure such that as the differential draw screw is turned about said turning axis in a first direction, the male end of the tool holder is moved toward a locked position in the female end of the shank, and as the differential draw screw is turned in the opposite direction, the tool holder is axially movable away from the shank;
said camming structure comprising said second bore comprising;
a camming member disposed in the second bore of the tool holder, the camming member having a threaded bore for receiving the inner end of the differential draw screw; and the camming structure being axially movable in the second bore of the tool holder to expand the fmustoconical section of the male structure into engagement with the shank female opening; the differential draw screw being operative to axially move the camming structure toward the shank frustoconical opening.

14. A tool holder apparatus as defined in claim 13, including means for preventing relative rotation between the tool holder and the shank when the external frustoconical structure of the tool holder is inserted into the frustoconical opening of the shank.

15. A tool holder apparatus as defined in claim 14, in which the tool holder has an annular seat around said turning axis, and the differential draw screw moves the tool holder along said turning axis to a position in which the annular seat on the tool holder has pressure engagement with an end face of the shank.

16. A tool holder apparatus as defined in claim 13, wherein the shank has a pin-receiving opening, and the tool holder has a pin-receiving opening, facing the pin-receiving opening the tool holder member, and including a pin disposed in both of said pin-receiving openings to prevent the tool holder member from turning about said turning axis with respect to the shank.

17. A tool holder apparatus as defined in claim 16, in which the pin-receiving opening in the tool holder member is disposed in a radial direction and intersects an annular seat of the tool holder, and the pin-receiving opening in the shank is disposed in a radial direction and intersects an end face of the shank.

* * * * *